US008451088B2

(12) United States Patent
Fisher

(10) Patent No.: US 8,451,088 B2

(45) Date of Patent: May 28, 2013

(54) ELECTRONIC LOCK BOX WITH TRANSPONDER BASED COMMUNICATIONS

(75) Inventor: Scott R. Fisher, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 1392 days.

(21) Appl. No.: 11/954,695

(22) Filed: Dec. 12, 2007

(65) Prior Publication Data

US 2008/0246587 A1 Oct. 9, 2008

Related U.S. Application Data

(60) Provisional application No. 60/875,520, filed on Dec. 18, 2006.

(51) Int. Cl.
*B60R 25/00* (2006.01)

(52) U.S. Cl.
USPC .......................................... 340/5.73; 340/570

(58) Field of Classification Search
None
See application file for complete search history.

(56) References Cited

U.S. PATENT DOCUMENTS

| | | | | |
|---|---|---|---|---|
| 4,691,338 | A * | 9/1987 | Makino | 455/417 |
| 4,916,443 | A | 4/1990 | Barrett et al. | |
| 5,377,906 | A | 1/1995 | Mason | |
| 5,397,884 | A | 3/1995 | Saliga | |
| 5,654,696 | A | 8/1997 | Barrett et al. | |
| 5,705,991 | A | 1/1998 | Kniffin et al. | |
| 6,072,402 | A | 6/2000 | Kniffin et al. | |
| 6,472,973 | B1 * | 10/2002 | Harold et al. | 340/5.73 |
| 6,603,389 | B1 * | 8/2003 | Murray | 340/7.2 |
| 6,609,204 | B1 * | 8/2003 | Olarig et al. | 726/35 |
| 6,624,742 | B1 | 9/2003 | Romano et al. | |
| 6,678,612 | B1 | 1/2004 | Khawam | |
| 6,727,801 | B1 * | 4/2004 | Gervasi et al. | 340/5.73 |
| 6,937,140 | B1 * | 8/2005 | Outslay et al. | 340/5.73 |
| 6,989,732 | B2 | 1/2006 | Fisher | |
| 7,009,489 | B2 | 3/2006 | Fisher | |
| 7,086,258 | B2 | 8/2006 | Fisher et al. | |
| 7,115,872 | B2 | 10/2006 | Bordynuit | |

(Continued)

FOREIGN PATENT DOCUMENTS

| | | |
|---|---|---|
| EP | 1 410 346 B1 | 9/2006 |
| GB | 2 364 413 B | 11/2004 |

OTHER PUBLICATIONS

International Search Report, PCT/GB01/02908, 4 pages (Jul. 19, 2002).

(Continued)

*Primary Examiner* — Mohammad Ghayour
*Assistant Examiner* — Brian Wilson
(74) *Attorney, Agent, or Firm* — Frederick H. Gribbell

(57) ABSTRACT

An electronic lock box contains a secure compartment for storing dwelling keys to a structure, and is typically mounted outside the dwelling structure. When properly instructed, usually with a coded message, the dwelling key can be accessed by opening the door to the secure compartment; such message can be manually entered on a keypad, or a programmed electronic key device can make the process more automatic. A lock box system uses a transponder at a dwelling base station (typically within the dwelling structure) to relay lock box status or access event information over a short range radio from the lock box to a remote central computer by using a more traditional communication system that is available within the dwelling. Additional sensors can be used to monitor the status of vandalism attempts. Furthermore, the lock box/transponder communications may be programmed so as to allow detection if the lock box is stolen.

6 Claims, 3 Drawing Sheets

U.S. PATENT DOCUMENTS

| | | | | |
|---|---|---|---|---|
| 7,177,819 | B2 * | 2/2007 | Muncaster et al. | 705/313 |
| 7,193,503 | B2 | 3/2007 | Fisher | |
| 7,336,174 | B1 * | 2/2008 | Maloney | 340/572.1 |
| 8,125,973 | B2 * | 2/2012 | Fisher-Jeffes et al. | 370/345 |
| 2001/0045449 | A1 * | 11/2001 | Shannon | 232/19 |
| 2003/0115148 | A1 * | 6/2003 | Takhar | 705/64 |
| 2003/0179075 | A1 | 9/2003 | Greenman | |
| 2004/0128159 | A1 * | 7/2004 | McGinn et al. | 705/1 |
| 2004/0160304 | A1 * | 8/2004 | Mosgrove et al. | 340/5.21 |
| 2004/0219903 | A1 * | 11/2004 | Despain et al. | 455/410 |
| 2004/0252017 | A1 * | 12/2004 | Holding et al. | 340/5.73 |
| 2005/0035848 | A1 * | 2/2005 | Syed et al. | 340/5.72 |
| 2006/0106628 | A1 * | 5/2006 | Faherty et al. | 705/1 |
| 2007/0290797 | A1 * | 12/2007 | Harkins et al. | 340/5.73 |

OTHER PUBLICATIONS

Preliminary Examination Report, PCT/GB01/02908, 19 pages (Oct. 18, 2002).

International Search Report, PCT/US08/006718, 13 pages (Aug. 8, 2008).

* cited by examiner

ELECTRONIC LOCK BOX WITH TRANSPONDER BASED COMMUNICATIONS

CROSS-REFERENCE TO RELATED APPLICATIONS

The present application claims priority to provisional patent application Ser. No. 60/875,520, titled "ELECTRONIC LOCK BOX WITH TRANSPONDER BASED COMMUNICATIONS," filed on Dec. 18, 2006.

TECHNICAL FIELD

The present invention relates generally to electronic lock equipment and is particularly directed to an electronic lock box of the type that contains a secure compartment for storing keys that allow entry to a structure or other objects. The invention is specifically disclosed as a system having an electronic lock box that includes a radio transmitter or transceiver that communicates to a central clearinghouse computer via an intermediate radio transponder to relay lock system information, in which the intermediate transponder is part of a dwelling base station. A radio communication message is sent to a local radio receiver (i.e., the transponder in the base station), and the communication message is further relayed to the central clearinghouse computer via a variety of inexpensive and convenient methods, such as dial-up modem, WiFi, or Bluetooth. Information to be exchanged between the central computer and the lock box can include such information as showing activity, security data such as vandalism attempts, lock box theft, lock box configuration information, battery state, showing completion, and showing feedback.

BACKGROUND OF THE INVENTION

In the real estate industry, there have been a number of patents issued for various feedback systems to communicate lockbox system information to a central computer system. Due to the remote nature of the placement of lockboxes, previous inventions have relied heavily upon the electronic key to carry the remote data back for upload to a central computer system during the key refresh or renewal cycle. One inherent problem with this method is there often is a time delay between the actual showing event and the reporting of data to a centralized database. For example, some real estate agents forget to renew or refresh their electronic key, and therefore, showing data is not uploaded in a timely fashion. The real estate market thrives on timely communication and action by its agents. Several methods have been attempted by companies such as GE-Supra to improve the reliability and speed at which data is exchanged between the lockbox and central computer system. One such method taught in U.S. Pat. No. 4,916,443 suggests that agents accessing lockboxes have redundant access log information written to their key such that the overall probability is increased that information is uploaded in a timely basis. Unfortunately, while this method marginally improves information exchange speed, there still could be a significant deficit in the timeliness of the information reported, due to the system inherently relying on the random actions of other agents in the system and the fact that this method essentially relies upon multiple showings in a very short period to be effective. Another such attempt taught in U.S. Pat. No. 6,072,402 suggests that all users carry an electronic key equipped with a wireless data capability such that lockbox system information is exchanged more quickly. In the system described in this patent, agents are required to use more cumbersome and expensive key devices to achieve the benefits of the system. While this system could be practical in an ideal world, the reality is not all agents wish to encumber themselves with expensive wireless data devices just to assist other agents in exchanging lockbox system information.

It has become realized that only a very small percentage of agents working with a given lockbox system will actually avail themselves of this type of technology. All of the aforementioned attempts have failed due to the fundamental reliance on 100% participation or 100% consistent actions of agents in a lockbox system. But none of these solutions allow the listing agent to gain definitive control over the reliable, consistent and timely reporting of lockbox activity and other information exchange needs of the real estate agent.

One preferred embodiment of the present invention will overcome the probable lack of timeliness in the communication infrastructure of the prior art systems and provide the listing agent the ability to ensure that timely data exchange occurs as their business needs dictate.

SUMMARY OF THE INVENTION

Accordingly, it is an advantage of the present invention to provide an electronic lock box system used in real estate sales systems which provides a method of real time communication with a central clearinghouse computer of lock box system information, using a transponder in a dwelling base station to relay messages between the electronic lock box and the central clearinghouse computer.

It is another advantage of the present invention to provide an electronic lock box system used in real estate sales systems that overcomes the probable lack of timeliness in the communication infrastructure of the prior art systems, and instead provides the listing agent with the ability to ensure that timely data exchange occurs as their business needs dictate.

It is yet another advantage of the present invention to provide an electronic lock box system used in real estate sales systems which allows a real estate agent to remotely reprogram features of the electronic lock box without visiting the property where the particular lock box is currently located.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, a second communications circuit, and a third communications circuit; and an external apparatus having a third control circuit, a third memory circuit, and a fourth communications circuit; wherein: (a) the electronic lock box is positioned at a first location that is physically separated from a second location of the dwelling base station; (b) the external apparatus is positioned at a third location that is physically separated from both the electronic lock box and the dwelling base station; (c) the first communications circuit is configured to exchange data signals with the second communications circuit, thereby allowing the electronic lock box to exchange data messages with the dwelling base station; (d) the third communications circuit is configured to exchange data signals with the fourth communications circuit, thereby allowing the dwelling base station to exchange data messages with the external apparatus; and (e) if the access element of the secure compartment is opened, the electronic lock box automatically notifies the dwelling base station of the opening status, and the dwelling base station automatically notifies the external apparatus of the opening status.

In accordance with another aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, and a second communications circuit; wherein: (a) the electronic lock box is positioned at a first location that is physically separated from a second location of the dwelling base station; (b) the first communications circuit is configured to exchange data signals with the second communications circuit, thereby allowing the electronic lock box to exchange data messages with the dwelling base station; and (c) the first control circuit is configured to cause the electronic lock box to periodically transmit a predetermined presence ping message, by use of the first communications circuit.

In accordance with yet another aspect of the present invention, an electronic lock box system is provided, which comprises: an electronic lock box having a first control circuit, a first memory circuit, a first communications circuit, a secure compartment with an access element, an impact sensor, and a shackle for attachment to a fixed object; a dwelling base station having a second control circuit, a second memory circuit, and a second communications circuit; wherein: (a) the electronic lock box is positioned at a first location that is physically separated from a second location of the dwelling base station; (b) the first communications circuit is configured to exchange data signals with the second communications circuit, thereby allowing the electronic lock box to exchange data messages with the dwelling base station; and (c) if the impact sensor is activated by a mechanical shock, the electronic lock box automatically notifies the dwelling base station of the activated status.

In accordance with still another aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, a second communications circuit, and a third communications circuit; an automation controller having third control circuit, a third memory circuit, a fourth communications circuit, and a first interface circuit that transmits command signals; at least one remote switching unit and a corresponding electrical load, the at least one remote switching unit having: (i) a second interface circuit that receives the command signals, and (ii) an output switching circuit that determines an amount of electrical current delivered to the electrical load; wherein: (a) the electronic lock box is positioned at a first location that is physically separated from a second location of the dwelling base station; (b) the at least one remote switching unit is positioned at a third location that is physically separated from the automation controller; (c) the first communications circuit is configured to exchange data signals with the second communications circuit, thereby allowing the electronic lock box to exchange data messages with the dwelling base station; (d) the third communications circuit is configured to exchange data signals with the fourth communications circuit, thereby allowing the dwelling base station to exchange data messages with the automation controller; and (e) the first interface circuit is configured to exchange data signals with the second interface circuit, thereby allowing the automation controller to exchange data messages with the at least one remote switching unit, and thereby to control its corresponding electrical load.

In accordance with a further aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, a second communications circuit, and a third communications circuit; and an audiovisual playback device having a third control circuit, a third memory circuit, a fourth communications circuit, a viewable display, and at least one audio speaker; wherein: (a) the electronic lock box is positioned at a first location that is physically separated from a second location of the dwelling base station; (b) the audiovisual playback device is positioned at a third location that is physically separated from the dwelling base station; (c) the first communications circuit is configured to exchange data signals with the second communications circuit, thereby allowing the electronic lock box to exchange data messages with the dwelling base station; and (d) the third communications circuit is configured to exchange data signals with the fourth communications circuit, thereby allowing the dwelling base station to exchange data messages with the audiovisual playback device, and to command the audiovisual playback device to play a prerecorded message.

In accordance with a yet further aspect of the present invention, an electronic lock box system is provided, which comprises: an electronic lock box having a first control circuit, a first memory circuit, a first communications circuit, a secure compartment with an access element, an impact sensor, and a shackle for attachment to a fixed object; an audible warning device having a second control circuit, a second memory circuit, a second communications circuit, and at least one audio output transducer; wherein: (a) the electronic lock box is positioned at a first location that is physically separated from a second location of the audible warning device; (b) the first communications circuit is configured to exchange data signals with the second communications circuit, thereby allowing the electronic lock box to exchange data messages with the audible warning device; and (c) if the impact sensor is activated by a mechanical shock, the electronic lock box automatically notifies the audible warning device of the activated status, and the audible warning device then automatically outputs a warning sound that is within the human hearing response range.

In accordance with a still further aspect of the present invention, an electronic lock box system is provided, which comprises: an electronic lock box having a first control circuit, a first memory circuit, a first communications circuit, a keypad, a secure compartment with an access element, and a shackle for attachment to a fixed object; a dwelling base station having a second control circuit, a second memory circuit, a second communications circuit, and a third communications circuit; and an external apparatus having a third control circuit, a third memory circuit, and a fourth communications circuit; wherein: (a) the electronic lock box is positioned at a first location that is physically separated from a second location of the dwelling base station; (b) the external apparatus is positioned at a third location that is physically separated from both the electronic lock box and the dwelling base station; (c) the first communications circuit is configured to exchange data signals with the second communications circuit, thereby allowing the electronic lock box to exchange data messages with the dwelling base station; (d) the third communications circuit is configured to exchange data signals with the fourth communications circuit, thereby allowing the dwelling base station to exchange data messages with the external apparatus; and (e) if a predetermined action is performed on the keypad, then the electronic lock box automatically sends an emergency alert message to the dwelling base station, and the dwelling base station automatically notifies the external apparatus of the emergency status.

In accordance with yet another aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, a second communications circuit, and a third communications circuit; and an external apparatus having a third control circuit, a third memory circuit, and a fourth communications circuit; wherein: (a) the electronic lock box is positioned at a first location that is physically separated from a second location of the dwelling base station; (b) the external apparatus is positioned at a third location that is physically separated from both the electronic lock box and the dwelling base station; (c) the first communications circuit is configured to exchange data signals with the second communications circuit, thereby allowing the electronic lock box to exchange data messages with the dwelling base station; (d) the third communications circuit is configured to exchange data signals with the fourth communications circuit, thereby allowing the dwelling base station to exchange data messages with the external apparatus; and (e) if the first control circuit determines that the electronic lock box is experiencing one of several types of predetermined events, then the electronic lock box automatically sends an alert message to the dwelling base station, and the dwelling base station automatically notifies the external apparatus of the alert status.

In accordance with still another aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, a second communications circuit, a third communications circuit, and a fourth communications circuit; an external apparatus having a third control circuit, a third memory circuit, and a fifth communications circuit; and a separate electronic key that includes a fourth control circuit, a fourth memory circuit, and a sixth communications circuit; wherein: (a) the electronic lock box is positioned at a first location that is physically separated from a second location of the dwelling base station; (b) the external apparatus is positioned at a third location that is physically separated from both the electronic lock box and the dwelling base station; (c) the first communications circuit is configured to exchange data signals with the second communications circuit, thereby allowing the electronic lock box to exchange data messages with the dwelling base station; (d) the third communications circuit is configured to exchange data signals with the fifth communications circuit, thereby allowing the dwelling base station to exchange data messages with the external apparatus; (e) the fourth communications circuit is configured to exchange data signals with the sixth communications circuit, thereby allowing the electronic key to exchange data messages with the dwelling base station; (f) the electronic key stores time-sensitive data in the fourth memory circuit, and requires periodic renewal to be useful for interfacing with an electronic lock box; and (g) if the second control circuit determines that the electronic key has transmitted a correct renewal request message to the dwelling base station, the second control circuit is configured to then upload the renewal request message to the external apparatus, after which a key renewal message is downloaded from the external apparatus to the dwelling base station, and the dwelling base station relays the key renewal message to the electronic key, thereby allowing the electronic key to be used in real time to access the secure compartment of the electronic lock box.

In accordance with yet a further aspect of the present invention, an electronic lock box system is provided, which comprises: an electronic lock box having a first control circuit, a first memory circuit, a first communications circuit, a secure compartment with an access element, and a shackle for attachment to a fixed object; a dwelling base station having a second control circuit, a second memory circuit, a second communications circuit, and a third communications circuit; wherein: (a) the electronic lock box is positioned at a first location that is physically separated from a second location of the dwelling base station; (b) the first communications circuit is configured to exchange data signals with the second communications circuit, thereby allowing the electronic lock box to exchange data messages with the dwelling base station; and (c) the third communications circuit is connected to a telephone line, and the third communications circuit, under the control of the second control circuit, is configured to automatically answer an incoming telephone call, and then to report a present status of a real estate showing over the telephone line.

In accordance with still a further aspect of the present invention, an electronic lock box system is provided, which comprises: an electronic lock box having a first control circuit, a first memory circuit, a first communications circuit, a second communications circuit, a secure compartment with an access element, and a shackle for attachment to a fixed object; a dwelling base station having a second control circuit, a second memory circuit, a third communications circuit, and a fourth communications circuit; an external apparatus having a third control circuit, a third memory circuit, and a fifth communications circuit; and a separate electronic key that includes a fourth control circuit, a fourth memory circuit, and a sixth communications circuit; wherein: (a) the electronic lock box is positioned at a first location that is physically separated from a second location of the dwelling base station; (b) the external apparatus is positioned at a third location that is physically separated from both the electronic lock box and the dwelling base station; (c) the first communications circuit is configured to exchange data signals with the third communications circuit, thereby allowing the electronic lock box to exchange data messages with the dwelling base station; (d) the fourth communications circuit is configured to exchange data signals with the fifth communications circuit, thereby allowing the dwelling base station to exchange data messages with the external apparatus; (e) the second communications circuit is configured to exchange data signals with the sixth communications circuit, thereby allowing the electronic key to exchange data messages with the electronic lock box; (f) the electronic key is activated by a human user who is attempting an access of the secure compartment of the electronic lock box; (g) if the first control circuit determines that the electronic key has transmitted a correct authorization code, access to the secure compartment of the electronic lock box will be granted, and then the first control circuit is configured to disable the electronic key by sending a disable message using the second communications circuit; and (h) if the first control circuit determines that the secure compartment of the electronic lock box has been properly closed and a separate mechanical key has been properly restored within the secure compartment, then the first control circuit is configured to re-enable the electronic key by sending an enable message using the second communications circuit.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
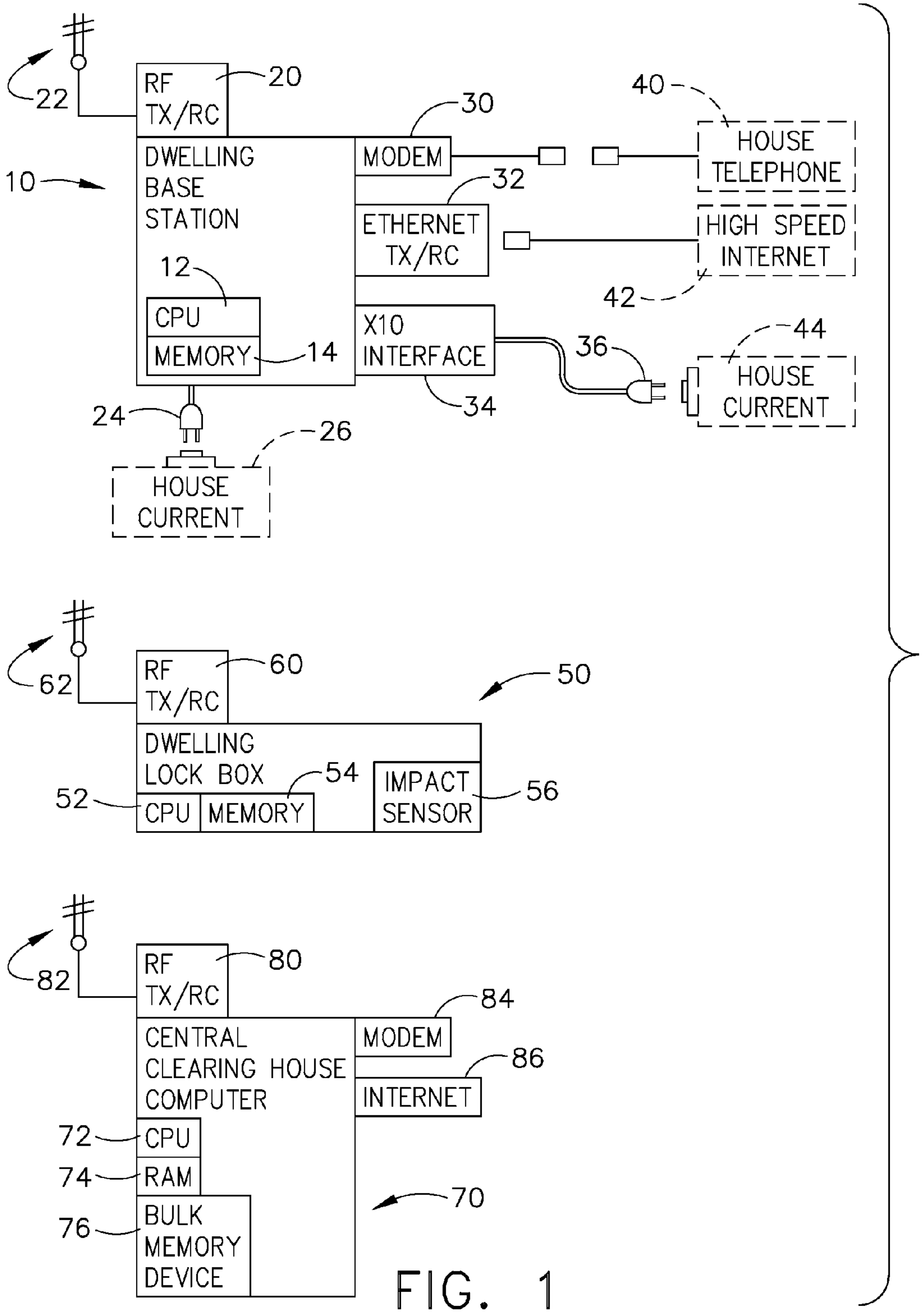
FIG. 1 is a diagrammatic view in block diagram form of an electronic lock box system, as constructed according to the principles of the present invention.

Reference will now be made in detail to the present preferred embodiment of the invention, an example of which is illustrated in the accompanying drawings, wherein like numerals indicate the same elements throughout the views.

The "basic" lock box invention, including advanced features, is more fully described in earlier patent documents by the same inventor, and assigned to SentriLock, Inc., including: U.S. Pat. No. 7,009,489, Issued Mar. 7, 2006, for ELECTRONIC LOCK SYSTEM AND METHOD FOR ITS USE; U.S. Pat. No. 6,989,732, Issued Jan. 24, 2006, for: ELECTRONIC LOCK SYSTEM AND METHOD FOR ITS USE WITH CARD ONLY MODE; U.S. Pat. No. 7,086,258; Ser. No. 10/805,020; Issued Aug. 8, 2006, for ELECTRONIC LOCK BOX WITH SINGLE LINEAR ACTUATOR OPERATING TWO DIFFERENT LATCHING MECHANISMS; U.S. patent application Ser. No. 10/805,018, filed on Mar. 19, 2004, for ELECTRONIC LOCK BOX WITH MULTIPLE MODES AND SECURITY STATES; U.S. patent application Ser. No. 11/193,932, filed on Jul. 29, 2005, for ELECTRONIC LOCK SYSTEM AND METHOD FOR ITS USE WITH A SECURE MEMORY CARD; U.S. patent application Ser. No. 11/585,038, filed on Oct. 23, 2006, for ELECTRONIC LOCK BOX USING A BIOMETRIC IDENTIFICATION DEVICE; and U.S. patent application Ser. No. 11/584,940, filed on Oct. 23, 2006, for ELECTRONIC LOCK BOX WITH KEY PRESENCE SENSING. These patent documents are incorporated by reference herein, in their entirety. The present invention is an improvement to these earlier designs, allowing a greater level of security and functionality by providing communications with a central computer, without the need for impractical long range radio communication circuitry in the lock box itself. A radio communication message is first sent to a local radio receiver (i.e., a transponder in a dwelling base station), and the communication message is further relayed to a central clearinghouse computer via a variety of inexpensive and convenient methods such as dial-up modem, WiFi, or Bluetooth. Information to be exchanged between the central computer and the lock box can include such information as showing activity, security data (such as vandalism attempts), lock box theft, lock box configuration information, battery state, showing completion, and showing feedback. Through the use of inexpensive short range radios, power consumption is reduced, communication reliability is increased, and usefulness of the lock box system is significantly enhanced.

As an overview, the present invention provides an electronic lock box system used in real estate sales systems in which an improvement is incorporated that provides a method of real time communication with a central clearinghouse computer of lock box system information. Some types of data that may be considered are time sensitive in a lock box system include:

- Lock box showing activity including duration of the showing.
- Status information indicating whether the key is present in the lock box.
- Is the lock box in a secure state?
- Has the lock box been stolen?
- Has a child successfully accessed the key through latchkey mode?
- Condition of the lock box battery.
- Impact (vandalism) sensor status.
- Lockout list of agents not allowed to access the key.
- Lock box configuration data such as contractor codes, shackle codes etc.

The exchange of information can be as simple as a single one way communication from the lock box to the central clearinghouse computer or as complicated as full two-way communication.

The components of the system include a lock box that is equipped with a short range radio transmitter and/or transceiver, and a transponder in a base station unit which receives the radio signal from the lock box and relays the data contained in the lock box transmission to the central clearinghouse computer in a number of possible different ways. The transponder could be equipped with a simple communications modem design to dial out over a telephone circuit and relay the data to the central clearinghouse computer over a similar modem connected telephone circuit. Another possible communication method would have the transponder connect to a wireless Internet® communications service and relay the data over the Internet. The wireless Internet could be a local WiFi connection (e.g., using the IEEE 80211 communication standard/specification), or alternatively could be a service covering a larger geographic area. Still another possibility is allowing the transponder to link to a "cellular" type telephone via infrared or BlueTooth communication protocols (e.g., using the IEEE 802.15.1 protocol), and thereby establish a wireless data connection to the central clearinghouse computer. Yet another possibility is to connect the transponder to a digital connection such as Ethernet or DSL, which is available in some dwellings.

Typically, the transponder is to be located inside the dwelling to protect it from the weather plus to provide added security. The transponder typically will be somewhat proximally located to the lock box, such that the received signal is adequate to exchange data reliably between the lock box and transponder. In addition, the transponder typically would be located such that it can successfully connect to the communication medium that is available in the particular dwelling. It may be possible in some circumstances, such as in a vacant home, to place the transponder in an adjacent dwelling.

It will be understood that the terms "dwelling," "property," and "home" as used herein include not only homes, such as houses, apartments, and condos, but also other types of buildings or structures that might be sold using a service such as a REALTOR® board. In addition, it will be understood that the term "transponder" as used herein includes not only "classic" electronic automatic response devices that receive a radio signal and automatically transmit an identification code, but also other types of electronic devices, such as computerized circuits, that can transmit more than one type of outgoing message after receiving more than one type of incoming message, in which the re-transmission of the incoming message might automatically occur quickly, or be intentionally delayed for some types of messages. (Examples of this are included below.) Further, it will be understood that the term "base station" as used herein includes not only such devices as a "classic transponder," but also represents electronic computer circuits that have many capabilities to transmit and receive messages using more than one type of communications medium, and further, in various forms, can transmit and receive various types of messages from both: (1) an electronic lock box of any type or manufacture, and (2) a central clearinghouse computer of any type or manufacture, and can both: (1) store and retrieve data in a memory circuit and (2) operate on data that is either previously stored in the memory circuit, or on new incoming data. It should be noted that, in this patent document, the terms "lock box" and "electronic lock box" have the same meaning.

Some of the improvements to an electronic lock box system using the principles of the present invention use two main components: (1) a specially designed transponder, and (2) a transmitter or transceiver situated with the electronic lock box itself.

The lock box transceiver would typically include several attributes to be generally practical in the implementation of this system of the present invention. First it could be manufactured of a sufficiently small size so as not negatively impact the overall dimensions of the electronic lock box. Second, the power consumption requirements should be relatively low, so as not to deplete the battery in the electronic lock box too quickly. Fortunately, many solutions exist today that provide off the shelf radio modules that can be incorporated easily into the design of the inventive electronic lock box. There also exist new integrated microcontrollers that have wireless radios and software built in. Once such example is Ember Wireless Communications Solutions' EM250 microcontroller with integrated ZigBee (e.g., using the IEEE 802.15.4 communication standard). Other common short range wireless radios support a variety of different protocols, such as BlueTooth, so the list of possible desirable solutions is quite large. While established protocols are helpful in device compatibility with other future devices, the data exchange needs could also be serviced by good old fashioned "bit banging" through off the shelf OEM radio modems, such as Chipcon's CC1100 low power RF products.

Communication between the lock box and transponder might typically occur in the ISM frequency bands (315/433/868/915 MHz), and therefore, such communication may be impaired by other unlicensed devices operating in the same band. The high sensitivity of today's RF receivers, typically −100 dBm or better, would normally be considered a benefit, however, the increased sensitivity also increases the sensitivity to interference from other transmitters. To combat that interference, several approaches can be used. Antenna gain can be limited, transmit power increased, frequency hopping, spread spectrum, and packet retransmission can all be used to improve transmission reliability. Time domain dependent communications can occur in electronic lock boxes equipped with highly accurate clocks, such as those disclosed in U.S. Pat. No. 7,009,489 in which rejection of unwanted signals can occur due to those signals arriving outside a predetermined time window. To activate such a system, the lock box and transponder would synchronize with each other when in close proximity and exchange valid frequencies and time windows in which to conduct communication.

The electronic lock box of the present invention can be designed to communicate in several modes. In one mode, referred to as a "polling mode" of operation (to conserve power), the electronic lock box will periodically "wake up," turn on its wireless transmitter, and transmit a status message to the transponder. If the lock box is equipped with a transceiver, its receive mode can then be enabled to receive a status message from the transponder indicating whether further communication is desired. This polling mode conserves battery power since the overall activity time, and therefore power consumption, is limited. Ideally, the user, through some action at the lock box such as installing the lock box on the listed house, will enable polling and, when the lock box is removed through a shackle release, the polling will be disabled to conserve battery power.

Polling could occur at a predetermined interval to provide a security "presence ping" to the transponder, or could simply occur when there is activity at the lock box such as accessing the key compartment. There could also be one or more special polling sessions driven by time of day, such as a nightly download of access log information or an upload of configuration information. It is advantageous to have the lock box be the "master" in the communication session, as it can schedule activities based on the lowest "cost" in terms of battery power consumption.

Assuming there is more information to exchange than the simple polling status messages, the electronic lock box can enter into a "communications mode" where further data is exchanged over the communications link. The lock box and/or a "smart" radio module can take advantage of various error correction, re-transmission, and communications recovery schemes to maximize the likelihood of successful, error free data exchange. In situations where the lock box contains only a transmitter, a transmission process of repeating the same communication message may be helpful in ensuring successful transmission to the transponder.

The transponder device used in the present invention typically will contain at least one receiver at a first communications port, capable of receiving the transmissions from the lock box; plus it will contain a second communications port that can transmit and relay the data to the central clearinghouse computer. The second communications port could be one of many possible options, as described elsewhere in this patent document; however, for the purpose of this particular description, a standard 2400 bps telephone communications modem will be used as an example. The transponder is ideally equipped with a microprocessor or microcontroller to manage the communication flow between the central clearinghouse computer and the lock box, however, a simple pass-through "radio modem" would be sufficient to achieve the benefits of the present invention. Communications sessions may be buffered by the transponder to take advantage of "off peak" calling rates, for example, or so as not to interfere with daytime telephone usage in a home.

An "intelligent" transponder may be programmed to optimize the communication session based on the needs of the real estate agent and the events occurring at the lock box. For example, larger uploads and downloads to/from the electronic lock box may be scheduled for late night hours, while showing events or security messages may be relayed immediately. The transponder may be programmed with a desired notification interval; in other words, an intelligent transponder can be programmed to automatically delay sending "routine" messages to the central computer, either based on a predetermined real time delay (e.g., 120 minutes), or using a predetermined time of day value (at 3:00 A.M.). The transponder's programming itself may be updated during its communication sessions with the lock box, or with the central clearinghouse computer.

A second embodiment of a transponder device could add to, or replace the telephone modem, with an Ethernet transceiver. Many homes today have broadband access, and an Ethernet link would eliminate phone line contention plus improve the speed of notifications. This would be especially important in situations where the homeowner does not have a traditional "POTS" (plain old telephone service) line. Ethernet would allow connection to a WiFi access point, to relay communications over a WAN (wide area network), MAN (metropolitan area network), or PAN (personal area network, to a relay station, for example).

Other possible features of the transponder used in the present invention are a visual LED indication of received signal strength from the lock box, such that proper orientation of the transponder to the lock box is easily achieved, a "power on" indication (e.g., an LED), and an "activity" indication (or LED). In one preferred embodiment, the transponder's second communications port includes an "off-hook" sense circuit such that if another telephone extension in the house goes off-hook, the transponder releases the phone line if the transponder is presently using it. This allows for the telephone user to make a call without being hampered by the transponder's activities. The transponder unit can also contain a keypad for entering various programming instructions, such as call back telephone numbers, etc.

Communications Description

A variety of lock system messages can be exchanged between the electronic lock box and the central clearinghouse computer. A summary of some of the relevant types can be found below.

Security Events

As the lock box is typically placed outside the dwelling, it can be an inviting target for individuals wishing to test its physical security limits, or it can be a potential target for thieves.

In one embodiment of the present invention, an impact type sensor is positioned integral to the lock box, in which the impact sensor activates when the lock box is exposed to physical shock exceeding a predetermined limit. This limit is typically above that of simply dropping the lock box to the ground. A piezo-type shock sensor, such as a Panasonic EFJ-G25EF01, would be suitable for this function. Upon impact, the lock box "wakes up" due to impact sensor activity and quickly transmits an "urgent" message to the transponder, indicating a physical attack is occurring. The transponder can then immediately initiate communication to the central clearinghouse computer and forward this urgent message for further processing. The central clearinghouse in this example could also be different than one used for normal real estate information.

Another security condition can alerted if the "presence ping" is not received by the transponder on a timely basis, such as after the expected lock box polling event has been determined to be "late." This can detect a situation where the lock box has been removed through the use of bolt cutters or other non-impact type tools.

Yet another security condition is where the lock box secured compartment has not been secured after a certain period of time following an access event. A sensor such as a limit switch or Hall effect device (e.g., an Allegro A3211) can detect the whether the secure compartment door is closed.

Key presence detection (of the dwelling key), as outlined in co-pending application Ser. No. 11/584,940, can also be signaled back to the transponder in the event the dwelling key is absent for an extended period of time, or if the secure compartment door is closed without the dwelling key having been returned to the lock box compartment.

Other noteworthy events can also be reported to the transponder. For example, unsuccessful attempts at access by use of a terminated electronic key, repeated use of keypad codes, too many bad (incorrect) PIN entries, or other security lockout conditions that may occur can all be reported to the transponder, and then to the central clearinghouse computer. It will be understood that the term "electronic key," represents many different types of computerized hardware devices, including a standard PDA (albeit with custom operating software), a portable computer with a secure memory device (see U.S. Pat. No. 6,989,732), a memory card containing memory elements that require a predetermined code to be accessed (again see U.S. Pat. No. 6,989,732), or a device sold by Supra/G.E. that typically is called an electronic key.

The electronic lock box can also act as an emergency communications device. For example, if a real estate agent were being accosted and forced to enter a home, the agent could clandestinely activate an emergency call function that would be relayed through the transponder, to signal that help is needed. The transponder's data could be correlated at a central clearinghouse computer to provide emergency personnel the pertinent location information where to dispatch help. In lock box system designs in which the electronic key has greater intelligence, such as those offered by GE-Supra, emergency alerting could also be initiated by the electronic key, in which the electronic key would signal the lock box, or transponder directly, of the emergency. The real estate agent could also carry a stand-alone portable signaling device that could transmit an "alert" signal to the lock box, or to the transponder, to initiate the emergency alert.

Status Events

A common condition, or "status event," could include relaying the battery status of the electronic lock box to the transponder. If the lock box battery is becoming depleted, a notification could be generated by the transponder to the listing agent indicating, for example, the lock box serial number and location that requires servicing. This message would typically be relayed through the central clearinghouse computer, although it would also be possible to program the transponder (as a dwelling base station) to send a message directly to the listing agent, via e-mail or a telephone call, for example.

Another status event that would be useful to report is inability for the showing agent to access the mechanical key. This could occur for a number of reasons, such as a forgotten electronic key, a forgotten PIN code, and so on. A notification could be generated by the electronic lock box or the transponder to the listing agent, advising that a showing was attempted but was unsuccessful. Again, this type of message would typically be relayed through the central clearinghouse computer, although it would also be possible to program the transponder (as a dwelling base station) to send a message directly to the listing agent, via e-mail or a telephone call, for example.

Data Download from the Electronic Key

During electronic lock box access, data stored in the electronic key could be relayed to the transponder unit for subsequent transmission the central clearinghouse computer. Time sensitive data could include showing activity that was stored on the key, and/or lock box local programming information performed at other lock boxes that do not have a transponder in range. For example, if the listing agent enables a function known as the "contractor mode" (see co-pending U.S. patent application Ser. No. 10/805,018, for example) on a first lock box (lock box A), this information can be saved to the electronic key. Once the electronic key is utilized in another (second) lock box (lock box B) where a transponder is present, the contractor mode activation could be transmitted for timely uploading to the central clearinghouse computer. It should be noted this transmission could occur through lock box B, even in situations where lock box A and B are not owned by the same person.

Data Upload from the Transponder to the Electronic Key

If an agent's electronic key is expired, the electronic lock box can execute a special function to contact the transponder and initiate a request to renew the key, via the central clearinghouse computer (CCC). The transponder can retrieve the electronic key's status and renewal information from the CCC, which can then be returned to the lock box to be ultimately written to the electronic key. If desired, this special function could occur in real time, more or less immediately, so the real estate agent can have his or her electronic key "renewed" within minutes (or less), and then proceed with showing the dwelling property.

Alternatively, such communication with the central clearinghouse computer could be scheduled for "off hours." If the communication is scheduled for off hours, a list of deactivated electronic keys can be uploaded to the transponder. If an electronic key is presented to an electronic lock box, in which the electronic key is on the deactivation list, then renewal at the lock box can be denied. To limit the size of the data set needed to be maintained on the transponder, the system can be designed so that only electronic keys that were deactivated within a certain recent (predetermined) time window could have their identity/status uploaded and stored on the transponder's memory. Any electronic key with an expiration that is out of date by more than the predetermined time window would not have the benefit of being able to be renewed at the lock box.

Another option is to build in an electronic key reader on the transponder itself, thus providing a convenient place for an agent to renew their electronic key (or key card) while the agent is out showing listings. The transponder would act as a remote communications terminal to exchange electronic key renewal information, and potentially also other time sensitive data.

Access Events

During normal activity, the lock box access events can be reported to the central clearinghouse computer. This reporting can be either immediate, or delayed by some predetermined time period. In addition to reporting the access event, the amount of time spent at the showing can be estimated, based on the duration that the lock box secure compartment was opened. This information may be used by the listing agent to ascertain a general level of interest in the property by a potential buyer.

Listing feedback information could be generated by the central clearinghouse computer to the showing agent either through e-mail, text message, or phone call at the real-time conclusion of the showing. As an alternative, this feedback information could also be generated by the transponder, if desired. Moreover, the transponder could generate a message to the central clearinghouse computer to inform the central computer that the showing has finished, by receiving a message from the lock box that the mechanical key has been returned to the secure compartment, and that the secure compartment door has been closed.

Showing conclusion can also be reported to the homeowner, advising them they can return home in the event the agent and potential buyer have left the dwelling as a result of the showing. This could be accomplished by the central clearinghouse computer dialing, text messaging, or e-mailing the listing agent and/or home seller of the information collected.

It is also possible to have the transponder perform some of the functions of the central clearinghouse computer, such as notification to the seller or homeowner. The transponder can be programmed to dial out to one or more stored telephone numbers (stored in the transponder's memory) that ring the seller's cell phone or perhaps the listing agent's cell phone. Most cell phones are equipped with caller identification services, so the seller would immediately know the incoming call was indicating the showing was complete, and therefore, eliminate the need for any voice announcement. The phone numbers previously described could be entered via a keypad located on the transponder, or could be programmed on the lock box keypad, and then transferred to the transponder by a command sequence initiated by the lock box owner. Alternatively, the information could be collected automatically via incoming caller identification, or a transponder equipped with a DTMF receiver could collect the callback number as entered by an incoming caller to the transponder. If the transponder is equipped with an Ethernet or WiFi interface, an e-mail could be initiated to the home seller or listing agent, over an available broadband connection (or other Internet connection) in the seller's house.

In an alternate embodiment, the transponder could be configured to answer an incoming call and advise of the showing status. Upon accessing the electronic key correctly, the transponder would receive an enable command from the lock box. This would activate an "auto-answer" mode in the transponder. In this mode, the home seller may dial their home phone number, and the transponder can answer the phone if it is equipped with a telephone modem or an analog interface. If the showing has been completed, the transponder can be programmed to play a message, or a distinct tone, to the home seller indicating the showing has been completed. Upon completion of the showing when the dwelling key is returned to the lock box and the lock box compartment door is secured, a disable command could be sent to the transponder from the electronic lock box, thereby preventing the transponder from answering (for a predetermined time interval, for example). The transponder could also be programmed to "auto-disable" and selectively answer only pre-programmed "calling from" numbers delivered by a caller identification service provided by the phone company. This would prevent the transponder from accidentally answering a call from someone other than the homeowner and allow those calls to be properly routed to voice mail services, answering machines, etc.

In yet another embodiment in electronic lock box system that use an electronic key that is equipped with a wireless data receiver or transceiver, the electronic key itself could act as the transponder. Short range data communication could occur between the transmitter/transceiver in the lock box and the electronic key. If the electronic key also is a cell phone or a smart phone, it could then act as the transponder and send the data to the central clearinghouse computer over wide area data communication systems, generally utilized by cell phones, etc. It is also possible that the electronic key could act independently of a central clearinghouse computer and contact the homeowner and/or listing agent of the showing completion status. This type of notification could occur via text message, automated e-mail, or via an actual phone call. The contact information could be transmitted up from the electronic lock box as part of the notification transmission, assuming a listing agent had previously entered the information on the lock box keypad, or uploaded it via the agent's electronic key, for example.

If the electronic key is not equipped with a lock box-compatible wireless radio transceiver, such as electronic keys using smart card technology developed by the present inventor or those utilizing infrared technology developed and sold by GE Supra, an incentive-based mode of electronic key operation can occur to ensure that showing completion is correctly determined and reported to a transponder unit. In this situation, the electronic key could be disabled from accessing other electronic lock boxes upon successful access to the secure compartment of the present lock box, until it establishes an infrared link with the same lock box (e.g., using the GE Supra system), or a smart card is inserted in the present lock box (e.g., using the present inventor's system, sold by SentriLock Inc.).

It should be noted that it is desirable to continue to allow electronic key access to the current lock box even during a key's "disabled" state. The lock box would check to see if the dwelling key was returned and/or secure compartment door closed, and then would re-enable the electronic key for access to other electronic lock boxes. Not only would this help to ensure that the electronic lock box door is closed by the showing agent, but it would also identify that the showing activity was completed. This series of events could be used to signal the transponder of the various showing event states or status events (e.g., showing start, showing completion, door status) and therefore, appropriate notification steps could be performed by the transponder.

Another feature of event reporting could involve access to the electronic lock box by a "latch-key" child. Typically, the electronic lock box can be programmed to enter a latch-key mode, in which subsequent showings are denied until a guardian comes home to re-enabled the electronic lock box access functions. It would be useful to report successful latch-key access to the guardian via text message, e-mail or cell phone call, to thereby verify that the child has accessed the electronic key successfully. The child would use a different dwelling key in one mode of operation, or the child could use the dwelling key that is stored in the secure compartment of the electronic lock box.

Lock Box Configuration

There are a multitude of electronic lock box configuration settings that could be modified through the transponder interface. The focus of the discussion here will be those settings and situations with which time is typically "of the essence." The transponder can gather the lock box's updated configuration data via regular polling of the central clearinghouse computer. This information can be stored or buffered until the next communication session with the lock box.

Lock Box Lockout

Electronic lock box lockout can take on two forms, the first being a "generalized lockout" when the listing goes pending or sold. Showing agents may not immediately recognize or realize that a listing is no longer on the market. This information is particularly valuable for so-called "high value" listings, where there is a tendency for showings to result from a source of public curiosity.

The second form of lockout is "specific agent lockout." While this feature has appeared in many prior art patent applications, its implementation was rarely practical, and certainly was inconvenient due to the need of a listing agent to visit the electronic lock box, or otherwise depend on the remote possibility that a showing agent would have lockout information on their electronic key. With the transponder system, lockout lists can be uploaded to the lock boxes on a regular basis, such as situations in which an agent is no longer an active member of a REALTOR® Association.

Security State

In co-pending patent application Ser. No. 10/805,018, an electronic lock box with first and second security states is described in which the second security state is "lower" than the first, and was also referred to as a "contractor mode" of operation. This keypad "contractor mode" was designed to allow non-keyholders to be able to gain access to the secure compartment where the dwelling key is typically stored. In other words, a contractor (rather than a real estate sales agent) would not have an electronic key or a smart card, and using the above-referenced contractor mode, could enter a specific numeric code on the keypad of the electronic lock box, and the secure compartment door would open under the appropriate conditions. Remotely enabling and disabling this feature without a physical visit to the property is another capability of the transponder communications interface. The owning agent of the specific lock box of interest could enter commands via the central clearinghouse computer (CCC), which would send a message to the corresponding transponder, and in turn that transponder would send a message to its proximal lock box to enable the contractor mode, and send the appropriate instructions to inform that lock box of the correct numeric code that will be acceptable, and during what time interval. The system could be set up so that the owning agent could execute this command from his or her personal computer, via the Internet to the CCC, for example, or perhaps could execute this command from his or her electronic key, such as a PDA (again via the Internet to the CCC).

Auxiliary Device Control

There are several types of auxiliary devices that could benefit from the transmission of electronic lock box access event status messages. The first type of auxiliary device is an audio or audiovisual device that plays a pre-recorded sound playback message or a pre-recorded video prepared by the listing agent, to be played for the potential homebuyers, during a showing of the listed property for sale. This audio/audiovisual device will also be referred to herein as an "A/V device." The A/V device contains a radio receiver that listens for a radio signal from the electronic lock box or the transponder.

Upon receiving notification of an access event, the A/V device goes from an inactive mode to an active mode. After a programmable time delay to allow the potential buyers and their agent to enter the home or dwelling (listed property), the A/V device can begin playing the pre-recorded message. Typically the A/V device would be located in close proximity to the entrance of the home. In situations where it is desirable to have the A/V device in more remote areas of the home, the A/V device could incorporate a proximity infrared (PIR) sensor, or an ultrasonic motion sensor, for example, to detect the motion of the prospective purchasers in the "remote area" of the home/dwelling. A suitable PIR sensor available at the present time is the Nicera SSAC10-11. The activation signal from the lock box or transponder would enable the PIR sensor to begin monitoring for motion. Once motion was detected in the remote area of the home, the playback would begin. Since the activation signal is required to enabled playback, it prevents undesirable playback during periods where the home is occupied by the homeowner. This device is described in more detail below.

Another type of external interface or auxiliary device that may be desirable is a home automation controller such as the type using the X10 protocol. The transponder unit would include an X10 interface that communicates over power connections in the home (e.g., using the 120 VAC line current, in the United States). The X10 interface can be built directly into the transponder, or be installed externally via a PL513 type interface. The transponder can be programmed to send X10 activation signals to various "remote" X10 units in the home/dwelling thereby allowing devices such as lamps to be turned on at the beginning of a showing. This improves the safety and convenience of the potential buyers and their agent as they tour the home/dwelling. Audio devices like radios and CD players can be set to play background music thus enhancing the ambience of the home/dwelling during the showing. These capabilities allow the listing agent to "stage" the home/dwelling with attractive attributes and lighting, thus improving the potential appeal to the homebuyer.

The various types of auxiliary devices that can be controlled in response to the access events of the electronic lock box secure compartment are extensive. Gates and garage doors and just a few of the possibilities of auxiliary devices that would benefit from being responsive to the lock box real time events.

As the embodiments above illustrate, similar advantages are found in the deactivation of the devices mentioned above upon closure of the secure compartment of the lock box.

Alarm System Control

The present invention can also control external alarm systems that are equipped with a receiver capable of receiving the electronic lock box access event transmissions. Since the lock box only transmits the access signal in reaction to a validated access by a trusted individual, a temporary deactivation of the home's security system can be automatically performed at the time a valid lock box access occurs. Alarm reactivation can then automatically occur at the time when the dwelling key is returned to the secure compartment of the lock box, using another message sent by the lock box to the home alarm system. In this manner, the homeowner need not give out a security code to the real estate agent, or to a contractor, thereby improving the overall security of the listed dwelling property for sale, and without being directly monitored by the homeowner (i.e., without the homeowner having to be present for activities to be performed by a contractor, for example).

Inverse to the function described above, the electronic lock box can also signal the external alarm system to initiate a distress call in the event the lock box is being tampered with.

Remote Sensor Network

Yet another capability of the transponder-based system of the present invention is the capability for remotely reporting telemetry data that could be used for wide ranging safety applications. Consider that electronic lock boxes used by real estate professionals are widely distributed over a geographic area, but yet are typically concentrated proportional to the population level of a given area. If properly used, the lock box can provide a mobile distributed sensor network that penetrates nearly every neighborhood. The transponder system of the present invention thus provides an inexpensive sensor network that could be harnessed for safety. For example, the lock box could be equipped with a low power radiation detector such as those described in U.S. Pat. No. 7,115,872. Detection of radiation could be relayed from the lock box to the central clearinghouse computer thus providing an alert to unusual radiation levels, or could be used as sensor network to determine radiation levels over a wide area in the event of a radiological incident.

Other data such as temperature measurements, humidity, or pollution parameters could all be accommodated by a lock box equipped with the appropriate sensors.

Referring now to FIG. 1, a dwelling electronic lock box is generally designated by the reference numeral 50, while a dwelling base station is generally designated by the reference numeral 10. As described above, the electronic lock box 50 and the base station 10 can communicate with one another using a low-power radio frequency communications link, and each device would have a small radio antenna. At the lock box 50 there is a radio frequency transmitter/receiver 60 that is connected to an antenna 62. At the base station 10, there is a radio frequency transmitter/receiver 20 that is connected to an antenna 22.

Lock box 50 will typically have some type of controller unit such as a microprocessor or microcontroller, generally designated by the reference numeral 52. Lock box 50 will also include memory elements used as a memory circuit 54, which can include both Random Access Memory (RAM) and Read Only Memory (ROM). Additional memory elements of memory circuit 54 will likely include non-volatile but changeable memory, such as EEPROM devices or NVRAM devices.

As discussed above, the lock box 50 may also include an impact sensor 56, which can be used to notify the base station 10 in case of an attempted removal or other type of damage being done to the lock box 50, including intentional damage.

Base station 10 will typically include some type of controller unit 12, such as a microprocessor or microcontroller. Base station 10 would also typically control a memory circuit 14, which probably will include both RAM and ROM elements, and also perhaps some non-volatile but changeable memory, such as EEPROM or NVRAM devices.

While most lock boxes are placed external to a building such as a dwelling, the base station 10 is typically to be installed within a building so that it can have access to an electrical power source, and wide area communications resources such as a telephone line or broadband Internet connection. For that purpose, an outlet for house current 26 is provided, and the base station 10 would then include a power cord with a socket at 24. This allows the base station to not only have potential access to other types of communications devices that will be described below, but also allows the base station 10 to be equipped with a radio frequency transceiver where the receiving elements can be left in the energized state continuously, if desired (as compared to using batteries, or some other type of power source that would be depleted).

Base station 10 is designed to have at least one type of communications device that would typically be found within a dwelling. For example, base station 10 could include a modem 30 that can plug into a standard house telephone circuit 40. Alternatively or additionally, base station 10 can have an Ethernet transmitter/receiver circuit 32 that is capable of communicating over a high speed Internet circuit 42 that is found in many homes (including fiber optic links). As a further alternative, base station 10 may have an X10 interface 34 that allows it to send communication messages through the 120 Volt AC house current circuit of most homes in the United States. The X10 interface 34 will typically have some type of plug 36 that can be physically installed in a socket for the house current 44 of a typical dwelling. This will allow the base station 10 to send messages to other X10 type devices within the same dwelling that are also plugged into the house current.

Another component of FIG. 1 is a central clearinghouse computer, generally designated by the reference numeral 70. This clearinghouse computer can have many functions, and some of these functions have been described in other patent documents by the same inventor, including those patent applications and issued patents noted herein. The central clearinghouse computer may contain the information for one or more real estate associations.

The central clearinghouse computer 70 would typically include a central processing unit 72, Random Access Memory (RAM) 74 as well as some type of operating software stored in nonvolatile memory, such as ROM or on a hard disk drive. In addition to the above, the clearinghouse computer 70 would typically include a bulk memory storage device 76, such as a large amount of hard disk drives or optical memory, for example. Bulk memory device 76 for most clearinghouse computers would typically contain a database of home listings, which would probably be cross-correlated to real estate listing agents and selling agents, and other attributes concerning homeowners, both buyers and sellers. This database would typically be stored in the bulk memory device 76, although it could also be stored off-site if desired, and perhaps connected through an Internet link or other type of secure data link.

When used in the present invention, central clearinghouse computer 70 would typically include a radio frequency transmitter/receiver device 80, which would be connected to an antenna 82. This would allow the clearinghouse computer to directly communicate with one or more of the base stations 10 that are found in dwellings, as used in the present invention. Another possibility is that the transmitter/receiver 80 of the clearinghouse computer 70 could possibly communicate directly with a dwelling lock box 50, via its transmitter/receiver 60 and antenna 62. This alternative use of a radio link may be less desirable in many ways than communicating with the base station 10, particularly since the lock box typically is battery powered.

Central clearinghouse computer 70 will also include other means of communications, and for the purposes of the present invention a modem 84/and or an Internet link 86 would be typically installed in the clearinghouse computer system. On FIG. 1, the dwelling base station 10 has a modem 30 that could communicate with the modem 84 of the central clearinghouse computer 70. Moreover, an Internet link 42 could be established between an Ethernet interface 32 of the dwelling base station 10 and the Internet interface 86 of the central clearinghouse computer 70.

Figure 2:
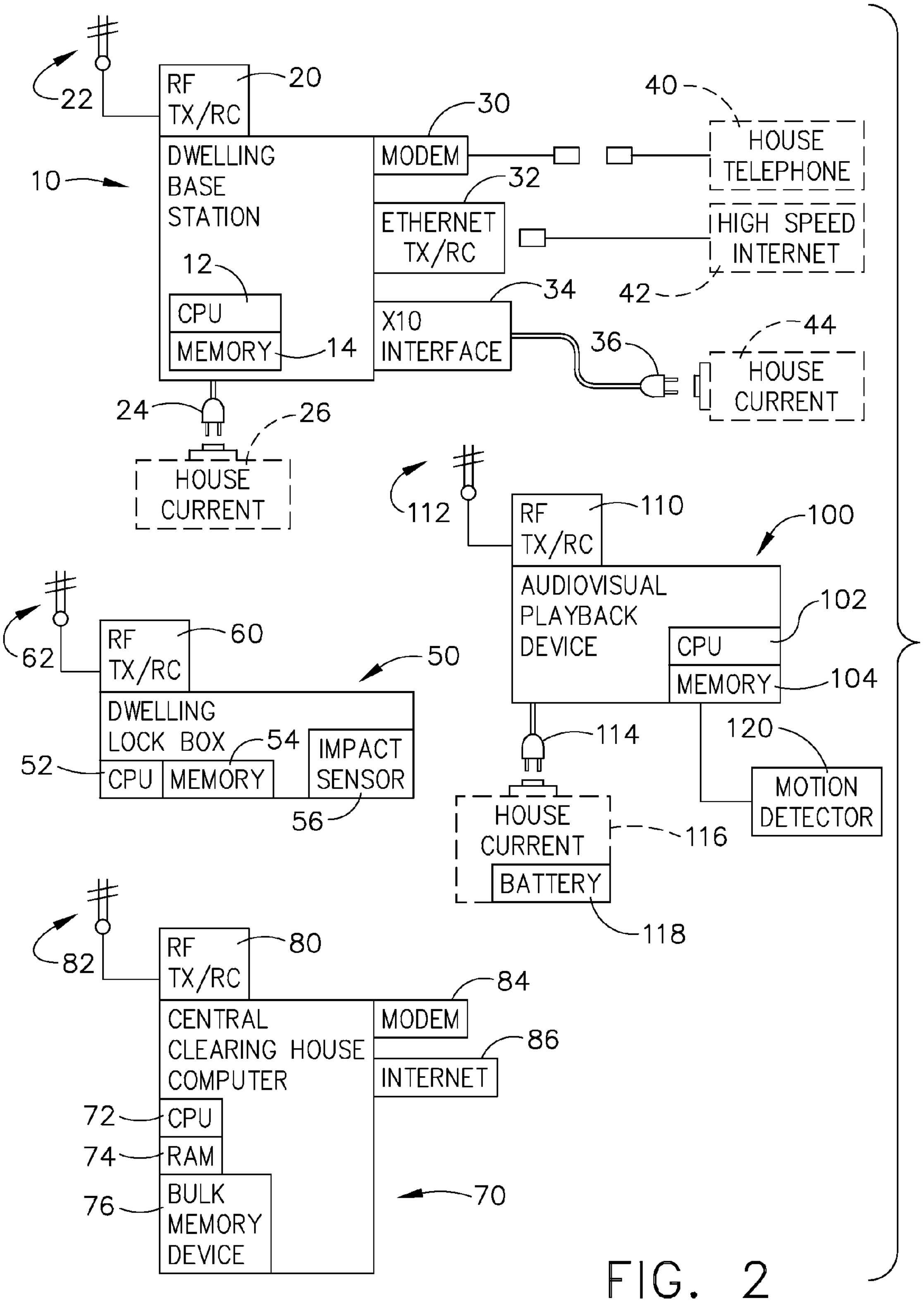
FIG. 2 is a diagrammatic view in block diagram form of the electronic lock box system of FIG. 1, with the addition of an audiovisual playback device.

Referring now to FIG. 2, a dwelling base station 10 is typically installed in a dwelling or other type of building that is available for sale, and a dwelling lock box 50 may be installed on the exterior of that same dwelling or building. FIG. 2 also includes a central clearinghouse computer 70, which would be used in the same way as described above with respect to FIG. 1. The dwelling base station 10 and dwelling lock box 50 on FIG. 2 also are able to operate in the same manner as that described in reference to FIG. 1, and also in other places in this patent document.

FIG. 2 includes an additional device, which is an audiovisual playback device, generally designated by the reference numeral 100. This device could be a standard television, for example, although it would also have some type of computer interface or video cassette recorder interface to allow a playback of a pre-recorded message. Typically the audiovisual (A/V) device 100 could be a television that can operate with a DVD playback unit or a videocassette player. When used with the present invention, there would potentially be a computer control using a CPU or microprocessor 102 along with an associated memory circuit 104. These devices would be used to "trigger" the actual playback on the A/V device 100.

The A/V playback device 100 can be triggered by a motion detector 120, for example, or by other specific devices, such as an acoustic sensing device (e.g., a microphone) that is programmed or hardware-configured to receive acoustic energy in the speech or voice frequency bands. Alternative activating devices 120 could include some type of ultrasonic sensing devices, which are often used as motion detectors, although many indoor motion detectors use a photodetector using the infrared light frequencies.

Another possible triggering device could be a radio frequency receiver, such as the transmitter/receiver indicated at the reference numeral 110 on FIG. 2. The radio frequency receiver could be connected to an antenna 112 to receive signals from the dwelling lock box 50, assuming it had radio frequency transmitter capabilities at 60, as indicated as a possibility on FIG. 2. For example, the showing agent could arrive at the dwelling that has been listed for real estate sales with his or her potential customer, and when the lock box 50 is activated, the radio frequency transmitter 60 could send a message that is received by the radio frequency receiver 110 at the A/V playback device 100. This may not be the only triggering device, because the motion detector 120 might also be used as an activating device in conjunction with the lock box activation. In other words, "any" type of motion that can be detected at the motion detector 120 might not be the desirable exclusive triggering event to actuate the A/V playback device 100. It might be better to have a requirement such that both the motion detector 120 senses the desired motion within a particular room, but within a predetermined time interval after the dwelling lock box 50 has been actuated. In this way, the A/V playback device 100 could essentially always be energized and ready for use, even when the existing homeowners are residing in the dwelling at times when there is no real estate showing to occur; the lock box actuation is a "pre-triggering event."

In addition to the above, a real time clock could be used as a triggering device to actuate the A/V playback device 100. This could be used as the sole actuating device, or it could be used as the "pre-triggering device" that could be used in conjunction with the motion detector 120. In other words, when the motion detector 120 detects motion within the given room, it would not start the actual playback program unless the CPU 102 had been previously notified by the real time clock that it was time to expect a showing for some potential customers. In that circumstance, the motion detector's sensing of actual motion would then be allowed to trigger the playback program of the A/V playback device 100.

As illustrated on FIG. 2, the A/V playback device 100 would typically be connected to house current 116 using a cord and a standard plug 114. Possibly the house current could be used to charge a battery 118 that could be part of a remote power source, or it could be included in the A/V playback device itself, if desired. The motion detector 120 and the radio frequency transmitter/receiver 110 all must be energized, as well as the CPU 102 and the memory 104. Certainly all of these devices could be energized using the house current 116, and if battery power is desired instead, then a specific modular power supply could be constructed and provided that includes a battery source, also a battery charger that plugs into house current.

Another alternative use of the A/V playback device 100 is possible when using the present invention. If the impact sensor 56 of the lock box notices an undesirable tampering of the lock box, the radio frequency transmitter/receiver 60 could send a message not only to the dwelling base station 10, but also to the A/V playback device 100. This potentially could trigger an alternative playback programming that could include some type of "panic alert" that makes loud noises within the house. This potentially could scare away an intruder or some vandals attempting to ruin the lock box or otherwise attempt illicit access of the dwelling key that is contained within the lock box secure compartment. As a secondary use of this panic alert mode, the message played back on the A/V playback device 100 could include other warning messages that are both audio and visual, and these warning messages could be triggered by the motion detector 120 after receiving a message from the dwelling lock box that it has been tampered with (e.g., if the impact sensor notices such tampering). Finally, the transmitter/receiver 110 could send a message to the dwelling base station transmitter/receiver 20, and have the dwelling base station 10 send a burglar activation message to a remote device, perhaps using the modem 30, the Internet link with the interface 32, or even the radio link through the radio transmitter/receiver 20. This message would typically be directed at a security service, although potentially with the hardware in place made available by the present invention, that the message could even be sent to the central clearinghouse computer 70. Of course, this would be a "new use" for the central clearinghouse computer 70, but from a hardware and software standpoint, it would at least be possible.

Figure 3:
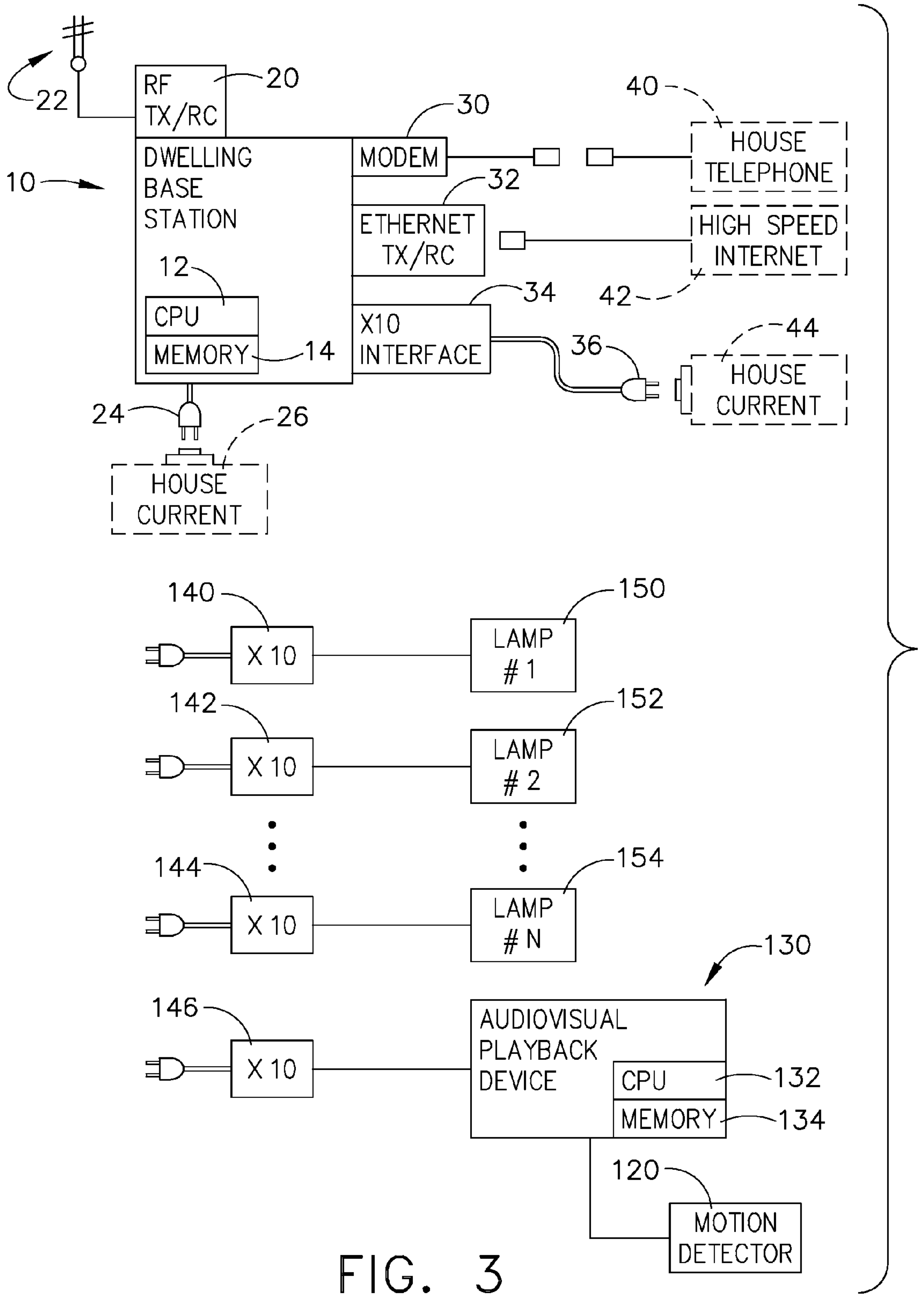
FIG. 3 is a diagrammatic view in block diagram form of the electronic lock box system of FIG. 1, with the addition of multiple X10 interface devices that control an audiovisual playback device and various lamps in the dwelling.

Referring now to FIG. 3, a dwelling base station 10 is depicted having the same interfaces and circuits as described above in reference to FIG. 1. The other components of FIG. 1 could also be part of this system now described with regard to FIG. 3, but they are not specifically illustrated for the purposes of clarity.

FIG. 3 includes additional X10 units to actuate lamps or other appliances, including an audiovisual playback device, generally designated by the reference numeral 130 on FIG. 3. As noted above, the dwelling base station 10 can have an X10 interface 34 that plugs into house current 44 using a standard 120 volt AC plug 36. Other X10 interfaces can be included at other outlets around the same dwelling.

On FIG. 3, additional X10 interfaces are illustrated at 140, 142, 144, and 146, which represent X10 interfaces at various different rooms of the dwelling. These X10 devices 140, 142, 144 are designed to actuate one or more lamps, respectively designated at 150, 152, and 154. There could be as many of these X10 interfaces and lamps as desired in the same dwelling. When the dwelling base station 10 receives a message from a dwelling lock box 50 that it has been properly actuated, the dwelling base station CPU 12 can send a message through its X10 interface 34 to actuate one or more of the lamps 150, 152, and 154. All three of these lamps could be actuated at one time, if desired, or they could be on a timer, or in combination with some type of motion detector device, as desired by the designer of the base station computer program to be used in this particular dwelling.

In addition, an X10 interface at 146 can actuate the audiovisual playback device 130, which can be again used to display a message to the prospective buyer of a dwelling. In this instance, the A/V playback device 130 will again include a CPU device such as a microprocessor at 132, and a memory circuit 134. A motion detector 120 could be used to assist in actuating the precise moment that the playback is started on the A/V device 130. In this configuration, the A/V playback device 130 would automatically be provided electrical power from the house current, via the X10 interface 146. Therefore, a battery module or other type of battery unit would not be necessary.

The A/V playback device 130 could be used in precisely the same manner as the A/V playback device 100 as described with respect to FIG. 2. This includes possible use as a "panic alert" device.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. An electronic lock box system, comprising:

an electronic lock box having a first control circuit, a first memory circuit, a first communications circuit, a secure compartment with an access element, and a shackle for attachment to a fixed object;

a dwelling base station having a second control circuit, a second memory circuit, a second communications circuit, and a third communications circuit;

wherein:

(a) said electronic lock box is positioned at a first location that is physically separated from a second location of said dwelling base station;

(b) said first communications circuit is configured to exchange data signals with said second communications circuit, thereby allowing said electronic lock box to exchange data messages with said dwelling base station;

(c) said third communications circuit is connected to a telephone line, and said third communications circuit, under the control of said second control circuit, is configured to automatically answer an incoming telephone call, and then to report a present status of a real estate showing over said telephone line; and (d) said second control circuit is configured to prevent said third communications circuit from answering an incoming telephone call for a predetermined time interval after said real estate showing has been completed.

2. An electronic lock box system, comprising:

an electronic lock box having a first control circuit, a first memory circuit, a first communications circuit, a second communications circuit, a secure compartment with an access element, and a shackle for attachment to a fixed object;

a dwelling base station having a second control circuit, a second memory circuit, a third communications circuit, and a fourth communications circuit;

an external apparatus having a third control circuit, a third memory circuit, and a fifth communications circuit; and a separate electronic key that includes a fourth control circuit, a fourth memory circuit, and a sixth communications circuit;

wherein:

(a) said electronic lock box is positioned at a first location that is physically separated from a second location of said dwelling base station;

(b) said external apparatus is positioned at a third location that is physically separated from both said electronic lock box and said dwelling base station;

(c) said first communications circuit is configured to exchange data signals with said third communications circuit, thereby allowing said electronic lock box to exchange data messages with said dwelling base station;

(d) said fourth communications circuit is configured to exchange data signals with said fifth communications circuit, thereby allowing said dwelling base station to exchange data messages with said external apparatus;

(e) said second communications circuit is configured to exchange data signals with said sixth communications circuit, thereby allowing said electronic key to exchange data messages with said electronic lock box;

(f) said electronic key is activated by a human user who is attempting an access of said secure compartment of the electronic lock box;

(g) if said first control circuit determines that said electronic key has transmitted a correct authorization code, access to said secure compartment of the electronic lock box will be granted, and then said first control circuit is configured to disable said electronic key by sending a disable message using said second communications circuit; and (h) if said first control circuit determines that said secure compartment of the electronic lock box has been properly closed and a separate mechanical key has been properly restored within the secure compartment, then said first control circuit is configured to re-enable said electronic key by sending an enable message using said second communications circuit.

3. The electronic lock box system of claim 2, wherein, after said electronic key is disabled by said disable message from said lock box, said electronic key will nevertheless be able to communicate with said second communications circuit of said lock box, while at the same time said electronic key will be not be enabled to communicate with any other lock box of said electronic lock box system.

4. An electronic lock box system, comprising:

an electronic lock box having a first control circuit, a first memory circuit, a first communications circuit, a secure compartment with an access element, and a shackle for attachment to a fixed object;

an electronic key having a second control circuit, a second memory circuit, a second communications circuit, and a third communications circuit; and wherein:

(a) said electronic lock box is positioned at a first location that is physically separated from a second location of said electronic key;

(b) said first communications circuit is configured to exchange data signals with said second communications circuit, thereby allowing said electronic lock box to exchange data messages with said electronic key;

(c) said electronic key is activated by a human user who is attempting an access of said secure compartment of the electronic lock box;

(d) if said first control circuit determines that said electronic key has transmitted a correct authorization code, access to said secure compartment of the electronic lock box will be granted, and then said first control circuit is configured to disable said electronic key by sending a disable message using said first communications circuit; and (e) if said first control circuit determines that said secure compartment of the electronic lock box has been properly closed and a separate dwelling key has been properly restored within the secure compartment, then said first control circuit is configured to re-enable said electronic key by sending an enable message using said first communications circuit.

5. The electronic lock box system of claim 4, further comprising a clearinghouse computer apparatus having a third control circuit, a third memory circuit, and a fourth communications circuit;

wherein:

(a) said clearinghouse computer apparatus is positioned at a third location that is physically separated from both said electronic lock box and said electronic key; and (b) said third communications circuit is configured to exchange data signals with said fourth communications circuit, thereby allowing said electronic key to exchange data messages with said clearinghouse computer apparatus.

6. The electronic lock box system of claim 5, wherein, after said electronic key is disabled by said disable message from said lock box, said electronic key will nevertheless be able to communicate with said second communications circuit of said lock box, while at the same time said electronic key will be not be enabled to communicate with any other lock box of said electronic lock box system.

* * * * *